United States Patent [19]

Kitamura et al.

[11] Patent Number: 4,670,529

[45] Date of Patent: Jun. 2, 1987

[54] PACKAGING SHRINK FILM

[75] Inventors: Shuji Kitamura, Nagaokakyo; Kiyohiko Nakae, Nishinomiya; Tadatoshi Ogawa; Teruaki Yoshida, both of Takatsuki; Hajime Sadatoshi, Ichihara, all of Japan

[73] Assignee: Sumitomo Chemical Company, Limited, Osaka, Japan

[21] Appl. No.: 679,867

[22] Filed: Dec. 10, 1984

[30] Foreign Application Priority Data

Dec. 14, 1983 [JP] Japan ................................ 58-236997

[51] Int. Cl.$^4$ .............................................. C08F 10/00
[52] U.S. Cl. .................... 526/348.1; 428/35; 428/516; 526/348.3
[58] Field of Search ................. 526/142, 348.1, 348.2, 526/348.3–348.6; 428/35, 516

[56] References Cited

U.S. PATENT DOCUMENTS

| 3,332,921 | 7/1967 | Cleary | 526/348.6 |
| 4,165,298 | 8/1979 | Shiga et al. | 526/142 |
| 4,210,738 | 7/1980 | Hermans et al. | 526/142 |
| 4,212,961 | 7/1980 | Kobayashi et al. | 526/142 |
| 4,232,139 | 11/1980 | Minami et al. | 526/142 |
| 4,252,851 | 2/1981 | Lansbury et al. | 526/348.6 |
| 4,322,514 | 3/1982 | Miyoshi et al. | 526/348.6 |
| 4,360,650 | 11/1982 | Desvignes et al. | 526/348.1 |
| 4,404,342 | 9/1983 | Miyoshi et al. | 526/348.6 |
| 4,412,049 | 10/1983 | Shiga et al. | 526/142 |
| 4,434,282 | 2/1984 | Esneault | 526/142 |

OTHER PUBLICATIONS

Encyclopedia of Polymer Science & Tech. Publi. N.Y. (1969) vol. 9, p. 647; vol. 11, pp. 613–614.

*Primary Examiner*—Edith Buffalow
*Attorney, Agent, or Firm*—Stevens, Davis, Miller & Mosher

[57] ABSTRACT

A packaging shrink film consisting essentially of a random copolymer of propylene and an α-olefin having 4 or more carbon atoms or a random copolymer of propylene, an α-olefin having 4 or more carbon atoms and ethylene, said random copolymer satisfying the following conditions:

(1) the content of an α-olefin having 4 or more carbon atoms in the copolymer is 8 to 30 mole %,
(2) the content of ethylene in the copolymer is 3 mole % or less,
(3) the content of a cold xylene-soluble portion in the copolymer is 15 to 60% by weight, and
(4) the content of a boiling n-heptane-insoluble portion in the copolymer is 7% by weight or more, said film having been stretched. The packaging shrink film is soft and excels in low-temperature shrink characteristics as well as in transparency and gloss.

8 Claims, No Drawings

PACKAGING SHRINK FILM

This invention relates to a packaging shrink film consisting essentially of a propylene copolymer, which film is soft and excels in low-temperature shrink characteristics as well as in transparency and gloss.

As raw materials for packaging shrink films, there are currently known polypropylenes, polyvinyl chlorides, polyethylenes, etc. Packaging shrink films produced from these raw materials each have strong points and weak points and none of them are fully satisfactory in all aspects.

Polyvinyl chloride films have excellent transparency and very excellent low-temperature shrinkability, but are poor in low-temperature resistance and further have a problem of food hygiene associated with plasticizers contained in the films as well as a problem of their disposal.

As polyethylene films, there have recently become available biaxially stretched films produced from linear low density polyethylenes. These films are improved in transparency, low-temperature resistance and low-temperature shrink characteristics as compared with conventional packaging shrink films produced form high-pressure polyethylenes, but are not satisfactory with respect to transparency.

As polypropylene films, there are biaxially stretched films produced from a propylene-ethylene random copolymer containing 3 to 5% by weight of ethylene or a propylene-ethylene-butene-1 random terpolymer containing 1 to 3% by weight of ethylene and 3 to 10% by weight of butene-1. These films are relatively excellent in transparency and gloss and relatively good in low-temperature shrink characteristics. However, they are stiff and have too high a shrinkage stress. Accordingly, they break during shrinking and moreover are inferior in low-temperature resistance. The propylene-ethylene-butene-1 random terpolymer is proposed in Japanese Patent Application Kokai (Laid-Open) No. 16,588/77, wherein it is essential to inhibit as much as possible the production of a soluble copolymer which is "valueless as by-product" because the stiffness of film is required. Japanese Patent Application Kokai (Laid-Open) No. 113,692/78, discloses a packaging shrink film of a soft propylene copolymer. Our duplication tests on this film revealed that the film is certainly good in transparency, low-temperature shrink characteristic and low-temperature resistance, but is poor in anti-blocking property and difficult to put into practice.

In view of the above situation, the present inventors have conducted extensive study for the purpose of developing a packaging shrink film of a propylene polymer which hardly breaks during shrinking, is soft, excels in transparency and gloss, is good in anti-blocking property and is relatively good in low-temperature shrink characteristic and low-temperature resistance. As a result, they have found that the above purpose can be achieved by forming into film a copolymer which comprises a specific comonomer as the main copolymer constituent and contains a specific boiling n-heptane-insoluble portion (BHIP) and a specific cold xylene-soluble portion (CXS) and is obtained by a specific polymerization method, and then stretching the film.

According to this invention, there is provided a packaging shrink film consisting essentially of a random copolymer of propylene and an α-olefin having 4 or more carbon atoms or a random copolymer of propylene, an α-olefin having 4 or more carbon atoms and ethylene, said random copolymer satisfying the following conditions:

(1) the content of an α-olefin having 4 or more carbon atoms in the copolymer is 8 to 30 mole %,
(2) the content of ethylene in the copolymer is 3 mole % or less,
(3) the content of a cold xylene-soluble portion in the copolymer is 15 to 60% by weight, and
(4) the content of a boiling n-heptane-insoluble portion in the copolymer is 7% by weight or more, said film having been stretched.

The first feature of the film according to this invention is that the film is soft, has an appropriate shrinkage stress and acccordingly hardly breaks during shrinking. The second feature is that the film is good in anti-blocking property. The third feature is that the film is very excellent in transparency and gloss. The fourth feature is that the film is relatively good in low-temperature shrink characteristics and low-temperature resistance.

The copolymer used in this invention is preferably produced by the so-called vapor phase polymerization method. This is because in the slurry polymerization method which is widely used and by which polymerization is carried out in an inert hydrocarbon, a large amount of the polymer obtained dissolves in the inert hydrocarbon solvent in a large amount, and hence, polymerization becomes very difficult. Therefore, not only is it difficult to obtain a soft polymer meeting the object of this invention, but also the polymer yield reduces markedly. Hence, the slurry polymerization is economically disadvantageous. The polymerization can be carried out in a fluidized bed type reactor, a stirring type reactor, a fluidized bed type reactor provided with a stirrer, or the like, all of which are known. Also, it is essential that the polymerization be carried out under such temperature and pressure conditions that the gas is not liquefied and polymer particles are not melted to form a mass in the reactor. Particularly preferable polymerization conditions are such that the temperature is 40° to 100° C. and the pressure is 1 to 50 kg/cm² (pressure at gauge; hereinafter referred to as G). Further, it is preferable to add a molecular weight regulating agent such as hydrogen or the like for the purpose of adjusting the melt flow property of the polymer obtained. The polymerization can be carried out batchwise, continuously or in combination of the two, and a monomer and a molecular weight regulating agent which are consumed in polymerization can be supplied to the reactor continuously or intermittently. The copolymer obtained may be washed, after polymerization, with an alcohol, a hydrocarbon solvent or the like for the purpose of removing the residual catalyst or low-molecular weight polymers.

The catalyst systems used in this invention for the production of the copolymer are the so-called Ziegler-Natta catalysts, namely, catalysts consisting of a compound of a transition metal of Groups IV to VIII of the Periodic Table and an organic compound of a typical metal of Groups I to III of the Periodic Table. It is preferable that the transition metal compound or a catalyst component containing the same be a solid. The transition metal compound is preferably a compound containing at least titanium and a halogen, and particularly preferable is a halogen compound of titanium represented by the formula $Ti(OR)_n X_{m-n}$ wherein R is a hydrocarbon group having 1 to 20 carbon atoms, X is a halogen, m is 2 to 4 and n is a number ranging from 0 to m-1. Specific examples of the compounds of the above formula are $TiCl_4$, $TiCl_3$, $TiCl_2$, $Ti(OC_2H_5)Cl_3$, $Ti(OC_6H_5)Cl_3$, etc.

The transition metal compound per se may be the main catalyst component or may be used as a catalyst component supported on an appropriate carrier.

In this invention, $TiCl_3$ among the halogen compounds of titanium is one of the most preferred transition metal compounds. It is known that this compound has $\alpha$, $\beta$, $\gamma$ and $\delta$ type crystal forms. In order for an $\alpha$-olefin of 3 or more carbon atoms to undergo stereoregular polymerization, $TiCl_3$ of the $\alpha$, $\beta$ and $\delta$ type having a layer-like crystal form is preferred. $TiCl_3$ is generally obtained as a $TiCl_3$ composition by reducing $TiCl_4$ with hydrogen, metallic aluminum, metallic titanium, an organo-aluminum compound, an organomagnesium compound or the like. Preferable $TiCl_3$ compositions are the so-called $TiCl_3$ AA obtained by reducing $TiCl_4$ with metallic aluminum and activating the resulting product by mechanical grinding, or the like, and a $TiCl_3$ composition obtained by reducing $TiCl_4$ with an organoaluminum compound and activating the resulting product with a complexing agent and a halogen compound. In this invention, the latter $TiCl_3$ composition is particularly preferred. For the transition metal compound, there can also preferably be used an alkoxy group-containing trivalent titanium halide obtained by reducing $Ti(OR)_4$, wherein R is a hydrocarbon group of 1 to 20 carbon atoms, with an organoaluminum compound and then treating the resulting product with an ether compound and $TiCl_4$.

A particularly preferable $TiCl_3$ composition or alkoxy group-containing trivalent titanium halide is such as to be able to produce 6,000 g per g or more of polypropylene when a system consisting of liquefied propylene, hydrogen, diethylaluminum chloride and the $TiCl_3$ composition or the alkoxy group-containing trivalent titanium halide is subjected to polymerization at 65° C. for 4 hr. Such a $TiCl_3$ composition can be produced by the methods disclosed in U.S. Pat. Nos. 4,210,738, 4,165,298, Japanese Patent Application Kokai (Laid-Open) No. 142,904/83, Japanese Patent Application No. 138,471/83, etc. Also, such an alkoxy group-containing trivalent titanium halide can be produced by the methods disclosed in Japanese Patent Application Kokai (Laid-Open) No. 126,401/84, etc.

When the transition metal compound is used as the catalyst component supported on an appropriate carrier, the carrier may be various solid polymers, particularly, $\alpha$-olefin polymers; various solid organic compounds, particularly, solid hydrocarbons; various solid inorganic compounds, particularly, oxides, hydroxides, carbonates and halides; and so forth. Preferable carriers are magnesium compounds such as magnesium halides, magnesium oxides, magnesium hydroxides, magnesium hydroxyhalides and the like. These magnesium compounds may be used as a complex with other solid substances mentioned above. As the magnesium compounds, commercially available ones may be used as they are but preferred are those obtained by mechanically grinding a commercially available magnesium compound or by dissolving it in a solvent and then allowing it to precipitate or by treating it with an electron-donating compound or an active hydrogen compound, or by decomposing an organomagnesium compound such as a Grignard reagent. In many cases, these procedures for obtaining a preferable magnesium compound are preferably used in combination. These procedures may be conducted at the time of the production of a carrier or the catalyst component. Particularly preferable magnesium compounds are magnesium halides and particularly preferable transition metal compounds are titanium halides as mentioned above. Therefore, a carrier-supported catalyst component composed essentially of a magnesium halide and a titanium halide is one of the most preferred catalyst components in this invention and can be produced by the methods disclosed in British Pat. No. 2,057,469 and U.S. Pat. No. 4,412,049.

For stereoregular polymerization of an $\alpha$-olefin having 3 or more carbon atoms, among them it is preferable to use a carrier-supported catalyst component comprising titanium, magnesium and halogen as the essential components and also comprising an electron-donating compound.

As the organic compound of a typical metal of Groups I to III of the Periodic Table, organoaluminum compounds are preferable. Particularly preferable are organoaluminum compounds represented by the formula $R_eAlX_{3-e}$ wherein R is a hydrocarbon group having 1 to 20 carbon atoms, X is a hydrogen atom or a halogen atom and e is a number of 1 to 3. Specific examples of these compounds are triethylaluminum, triisobutylaluminum, diethylaluminum hydride, diethylaluminum chloride, diethylaluminum bromide, ethylaluminum sesquichloride, ethylaluminum dichloride, etc. The most preferable compounds are triethylaluminum, diethylaluminum chloride and their mixtures.

Though the catalyst used in this invention comprises the above-mentioned transition metal compound and the above-mentioned organometal compound, it may further contain an electron-donating compound for enhancing the catalyst activity and the stereoregularity of polymer obtained.

The electron-donating compound includes esters and acid anhydrides such as ethyl acetate, $\epsilon$-caprolactone, methyl methacrylate, ethyl benzoate, ethyl p-anisate, methyl p-toluate, phthalic anhydride and the like; ether compounds such as di-n-butyl ether, diphenyl ether, diethylene glycol dimethyl ether and the like; organophosphorus compounds such as tri-n-butyl phosphite, triphenyl phosphite and hexamethylene phosphoric triamide and the like; etc. Further, it includes ketones, amines, amides, thioethers, organosilicon compounds such as alkoxysilanes and aryloxysilanes both having a Si-O-C bond, etc.

The solid catalyst component may be treated, before its use in the vapor phase polymerization, with a small amount of an olefin in the presence of an organoaluminum compound alone or together with an electron-donating compound to undergo pre-polymerization.

In the propylene copolymer used in this invention, an $\alpha$-olefin having 4 or more carbon atoms or both the $\alpha$-olefin and a very small amount of ethylene are used as comonomers. As the $\alpha$-olefin having 4 or more carbon atoms, there may be used butene-1, pentene-1, hexene-1, 4-methylpentene-1 or the like alone or in admixture of two or more, and among them, butene-1 is most preferred because it is difficult to liquefy and a high partial pressure can be obtained. When the major component of the comonomer is ethylene and even when the major component of the comonomer is an $\alpha$-olefin having 4 or more carbon atoms if the ethylene content exceeds a specific level, the deterioration of transparency and the deterioration of the film transparency with the lapse of time which seems to be due to the bleeding of an atactic component are caused, so that such condition is not desired. The content of an α-olefin having 4 or more carbon atoms in the copolymer used in this invention is 8 to 30 mole %, preferably 10 to 25 mole %. If the content of an α-olefin having 4 or more carbon atoms is smaller than the above-mentioned lower limit, the softness of the copolymer is lost and its transparency is deteriorated, and hence such condition is not desired. If the α-olefin content exceeds the above upper limit, the state of powder becomes bad (tends to be melted to form a mass) in the vapor phase polymerization, which makes the stable production of a copolymer difficult or makes the copolymer too soft. The ethylene content in the copolymer used in this invention is 3 mole % or less, preferably 2.5 mole % or less. If the ethylene content exceeds the above-mentioned upper limit, film transparency is deteriorated with the lapse of time, so that such condition is not desired. Although the reason therefor is not clear, bleeding of an atactic component seems to be a cause thereof.

The content of the cold xylene-soluble portion (CXS) in the copolymer used in this invention is 15 to 60% by weight, preferably 17 to 50% by weight. If the CXS content is less than the above-mentioned lower limit, the softness of the copolymer is difficult to obtain, its transparency is deteriorated and the yield of polymer becomes unsatisfactory. If the CXS content exceeds the above-mentioned upper limit, the state of powder becomes bad (tends to be melted to form a mass) in the vapor phase polymerization, which makes the polymerization substantially impossible or makes the copolymer produced too soft.

The content of the boiling n-heptane-insoluble portion (BHIP) in the copolymer used in this invention is 7% by weight or more, preferably 10% by weight or more. If the content is smaller than the above-mentioned lower limit, the anti-blocking property of the film obtained becomes poor.

When the copolymer used in this invention is produced by the vapor phase polymerization method, after the polymerization, the copolymer may or may not be subjected to a moderate post-treatment such as washing or the like. In any case, it is sufficient that the copolymer is in the above-defined range at the time of its use.

The copolymer used in this invention may be blended with at most about 20% by weight of a rubbery ethylene-α-olefin random copolymer and also with a small amount of other high molecular weight materials. Further, the copolymer may contain additives such as an antistatic agent, an anti-blocking agent, a stabilizer and the like.

As the method of molding the copolymer into a film in this invention, there may be used a well-known processing method such as a T-die casting method, a water cooling blown method or the like. Also, as the method of stretching, there may be used a well-known uniaxial stretching process such as roll stretching, compression rolling or the like, or a well-known biaxial stretching process such as tenter biaxial stretching, tubular biaxial stretching or the like. The stretching temperature is preferably from room temperature to the melting point of the copolymer, and the stretching ratio is preferably 2 to 10. In stretching, the stretching ratios in the machine and transverse directions need not be balanced. Any of the ratios can be selected depending upon the application of film. Also, heat setting may be applied to the film.

The film thus obtained preferably has Young's moduli in the machine and transverse directions of 3,000 to 9,000 kg/cm$^2$, more preferably 5,000 to 8,000 kg/cm$^2$. If the Young's modulus of the film is smaller than the lower limit, the film loses its stiffness and becomes insufficient in shrinkage stress and binding power. If the Young's modulus is larger than the upper limit, the film loses its softness and breaks often during shrinkage.

The packaging shrink film of propylene copolymer thus produced hardly breaks during shrinkage, is soft, excels in transparency and gloss, is good in anti-blocking property and is relatively good in low-temperature shrink characteristics and low-temperature resistance. Moreover, the film can be produced at a low cost. Therefore, the film can have a very high practical value.

This invention will be explained in more detail below referring to Examples and Comparative Examples; however it should not be interpreted that the invention be limited to the Examples.

The data and evaluation values in the Examples and Comparative Examples were obtained in the following ways:

(1) α-Olefin content in copolymer

It was determined from material balance. As for the content of butene-1, the material balance was confirmed by determining the amount of butene-1 in the usual way based on the characteristic absorption at 770 cm$^{-1}$ obtained with an infrared spectrometer. Incidentally, in the measurement by means of an infrared spectrometer, a calibration curve of a propylene-butene-1 copolymer was prepared from the amounts determined by means of $^{13}$C-NMR, and the determination of the amount of butene-1 was made based thereon.

(2) Ethylene content in copolymer

It was determined from material balance. Further, the determination of the amount of ethylene was conducted in the usual way based on the characteristic absorptions at 732 cm$^{-1}$ and 720 cm$^{-1}$ obtained with an infrared spectrometer, whereby the result of the material balance was confirmed. Incidentally, in the measurement by means of an infrared spectrometer, a calibration curve of an ethylene copolymer was prepared based on the amounts determined by the radiation measurement of $^{14}$C-labelled ethylene copolymer, and the determination of the amount of ethylene was made based thereon.

(3) Cold xylene-soluble portion (CXS)

In 500 ml of xylene was dissolved 5 g of a polymer, and the mixture was gradually cooled down to room temperature. Then, the mixture was allowed to stand in a batch at 20° C. for 4 hr and thereafter filtered, and the filtrate was concentrated to dryness and dried. The solid thus obtained was weighed.

(4) Boiling n-heptane-insoluble portion (BHIP)

Extraction was conducted for 14 hr by the use of a Soxhlet extractor. The frequency of refluxing was once every 5 min. The extraction residue was dried and weighed to obtain a BHIP.

(5) Intrinsic viscosity ([η])

Viscosities were measured at different concentrations of 0.4, 0.2, 0.133 and 0.1 g/dl in the usual way in Tetralin at 135° C.

(6) ΔHaze

A press sheet of a copolymer with a thickness of 100μ was prepared and annealed at 60° C. for 9 hr. ΔHaze was expressed as a difference between the haze valued before and after annealing. The haze was determined by the method mentioned in the item (8) appearing hereinafter.

(7) Young's modulus of film

It was determined in accordance with ASTM-D882, provided that the shape of a test piece was a strip of 20×120 mm
the distance between chucks was 50 mm, and the tensile speed was 5 mm/min.

(8) Haze

It was determined in accordance with ASTM-D1003.

(9) Gloss

It was determined in accordance with ASTM-D523.

(10) Percentage of shrinkage upon heating

A film test piece of 5 cm×5 cm was immersed in a glycerine bath at a given temperature for 10 sec and then the dimensions of the test piece in the machine and transverse directions were measured. The percentage of shrinkage was calculated using the following equation:

Percentage of shrinkage (%) =

$$\frac{\left(\begin{array}{c}\text{Dimension before}\\ \text{heating}\end{array}\right) - \left(\begin{array}{c}\text{Dimension after}\\ \text{heating}\end{array}\right)}{\text{Dimension before heating}} \times 100$$

(11) Blocking

Two sheets of a film were piled and a load of 7 kg/100 cm$^2$ was applied therein, and allowed to stand under these conditions for 24 hr at 23° C. Then, they were peeled from each other by applying a peeling force in a direction perpendicular to the film surface at a load-increasing rate of 10 g/min. The maximum peeling force (g) when peeling occured was measured and it was converted to a value per unit film area (100 cm$^2$). This value per 100 cm$^2$ was used as blocking.

EXAMPLE 1

(1) Preparation of a titanium trichloride-containing solid catalyst

After a 1-liter flask provided with a stirrer and a dropping funnel was purged with argon, a solution consisting of 60 ml of titanium tetrachloride and 228 ml of n-heptane was placed in said flask, and a solution of 136.6 ml of ethyl-aluminium sesquichloride and 300 ml of n-heptane was dropped thereinto at a temperature of −5° to −10° C. over a period of 2 hours. After the completion of dropping, the resulting mixture was stirred at room temperature for 30 minutes, and then the temperature of the mixture was raised to 80° C. The mixture was subjected to heat treatment at 80° C. for 1 hour, and then allowed to stand at room temperature to separate it into a solid and a liquid. The solid obtained was then washed with four 400-ml portions of heptane. Subsequently, 580 ml of n-heptane and 5 ml of diethylaluminum chloride were placed in the flask, and the temperature of the contents of the flask was maintained at 50° C. While stirring the contents, 32 g of propylene was slowly fed to the resulting suspension at 50° C. over a period of 2 hours, and the pre-polymerization treatment of propylene was conducted. After the treatment, the pre-polymerization mixture was separated into a solid and a liquid, and the solid obtained was washed with two 400-ml portions of n-heptane.

Subsequently, 392 ml of toluene was placed in the flask and the temperature of the toluene was maintained at 85° C. While stirring the toluene 117 ml of n-butyl ether and 3.7 ml of tri-n-octylamine were added thereto, and the resulting mixture was subjected to reaction at 85° C. for 15 minutes. After the reaction, a solution of 15.5 g of iodine in 196 ml of toluene was added to the reaction mixture, and the resulting mixture was further subjected to reaction at 85° C. for 45 minutes.

After the reaction, the reaction mixture was separated into a solid and a liquid, and the solid obtained was washed with 500 ml of toluene and then three 500-ml portions of n-heptane, and dried under reduced pressure to obtain 90 g of a titanium trichloride-containing solid catalyst. This solid catalyst contained 65.2% by weight of titanium trichloride.

(2) Copolymerization

By using a fluidized bed type reactor having an internal volume of 1 m$^3$ provided with a stirrer, copolymerization of propylene and butene-1 was conducted. First of all, 60 kg of propylene-butene-1 copolymer particles for dispersing catalyst were fed to the reactor, which reactor was then purged with nitrogen and then with propylene. The internal pressure of the reactor was raised to 5 kg/cm$^2$G with propylene, and a circulation gas was fed from the bottom of the reactor at a flow rate of 80 m$^3$/hour to maintain the polymer particles in the fluidized state. Subsequently, the following catalysts were supplied to the reactor, in which the catalyst components (b) and (c) were used in the form of a heptane solution:

| (a) titanium trichloride-containing solid catalyst | 21 g |
| (b) diethylaluminum chloride | 112 g |
| (c) triethylaluminum | 11 g |
| (d) methyl methacrylate | 8 g |

Subsequently, hydrogen, propylene and butene-1 were fed to said reactor so that the concentrations of hydrogen and butene-1 were 1.7% by volume and 20% by volume, respectively, and the internal pressure of the reactor was raised to 10 kg/cm$^2$G, after which the temperature of the fluidized bed was adjusted to 65° C. to initiate polymerization. During the polymerization, hydrogen, propylene and butene-1 were supplied so as to maintain the concentrations and pressures of hydrogen and butene-1 constant. When 75 kg of a polymer was formed in addition to the 60 kg of the propylene-butene-1 copolymer iniitally added to the reactor, 60 kg of the polymer particles were left in the reactor for dispersing catalysts for the next polymerization, and the residual polymer particles were transferred to a stirring-mixing tank. To said mixing tank were fed 210 g of propylene oxide and 100 g of methanol, and the resulting mixture was treated at 80° C. for 30 minutes. Subsequently, the treated mixture was dried to obtain a white powdery polymer. In the above reactor, the second and third polymerization procedures with after-treatments were successively carried out under the same conditions as in the first polymerization. The physical properties of the polymer obtained in the third polymerization procedure were measured. Table 1 shows the result.

(3) Film forming

Form the copolymer produced in above (2), there was obtained a sheet of 400μ in thickness by the press method. It was cut into a 90×90 mm sheet and the sheet was stretched under the following conditions to prepare a biaxially stretched film.

Stretching machine: A bench biaxial stretching machine, manufactured by Toyo Seiki
Temperature: 115° C.
Preheating time: 3 min
Stretching ratio: Machine direction 5 times, transverse direction 5 times
Stretching speed: 15 m/min The physical properties of the thus obtained film having a thickness of about 15μ are shown in Table 2. This biaxially stretched film was soft, had very excellent transparency and gloss and also was relatively good in low-temperature shrink characteristics.

EXAMPLE 2

A copolymer was produced under the same catalyst system as in Example 1 under the same polymerization conditions as in Example 1, except that the amounts of butene-1 and hydrogen charged were changed. The basic specifications of this copolymer are shown in Table 1. Using the copolymer, a biaxially stretched film was produced under the same conditions as in Example 1. The physical properties of this film are shown in Table 2. This biaxially stretched film was as good as the biaxially stretched film of Example 1.

EXAMPLE 3

A copolymer was produced with the same catalyst as in Example 1 under the same polymerization conditions as in Example 1, except that the amounts of butene-1 and hydrogen charged were changed and ethylene was newly charged. The basic specifications of this copolymer are shown in Table 1. Using the copolymer, a biaxially stretched film was produced under the same conditions as in Example 1. The physical properties of this film are shown in Table 2. This biaxially stretched film was as good as the biaxially stretched films of Examples 1 and 2.

COMPARATIVE EXAMPLE 1

A copolymer was produced with the same catalyst as in Example 1 under the same polymerization conditions as in Example 1, except that the amount of hydrogen charged was changed and ethylene was substituted for the butene-1. The basic specifications of this copolymer are shown in Table 1. Using the copolymer, a biaxially stretched film was produced under the same conditions as in Example 1. This film was good in softness; however a seemingly atactic component bleeded onto the film surface with the lapse of time, whereby the film transparency was deteriorated, and the film had no practical applicability. This indicates that a copolymer containing ethylene as the major comonomer and having a high CXS content does not meet the object of this invention.

COMPARATIVE EXAMPLE 2

A copolymer was produced with the same catalyst as in Example 1 under the same polymerization conditions as in Example 1, except that the amounts of butene-1 and hydrogen charged were changed and ethylene was newly charged. The basic specifications of this copolymer are shown in Table 1. Using the copolymer, a biaxially stretched film was produced under the same conditions as in Example 1. This film met the object of this invention with respect to softness; however a seemingly atactic component bleeded onto the film surface with the lapse of time as in Comparative Example 1, whereby the film transparency was deteriorated, and the film had no practical applicability. This indicates that even if a copolymer contains butene-1 as the major comonomer, when the ethylene content exceeds a certain value and the CXS content is large, the copolymer does not meet the object of this invention from the standpoint of deterioration of transparency with the lapse of time.

COMPARATIVE EXAMPLE 3

A copolymer used in this Comparative Example was produced by the slurry polymerization method using n-heptane as a solvent, and hence freed of a large amount of an atactic component soluble in n-heptane. The basic specifications of this copolymer are shown in Table 1. Using this copolymer, a biaxially stretched film was produced under the same conditions as in Example 1. The physical properties of this film are shown in Table 2. The film was high in Young's modulus and relatively good in transparency and gloss but they cannot be said to be excellent. Therefore, the film did not meet the object of this invention. This indicated that even if a copolymer contains butene-1 as the major comonomer, when the CXS content does not fall within the specified range of this invention, the copolymer cannot achieve the object of this invention.

COMPARATIVE EXAMPLE 4

A copolymer used in this Comparative Example was produced by the slurry polymerization method using n-heptane as a solvent, and hence freed of an atactic component soluble in n-heptane. The basic specifications of this copolymer are shown in Table 1. Using this copolymer, a biaxially stretched film was produced under the same conditions as in Example 1. The physical properties of this film are shown in Table 2. This biaxially stretched film was good in softness, but was poor in transparency and gloss. This indicates that, in a copolymer containing ethylene as the major comonomer, the flexibilization and the inhibition of change in transparency with the lapse of time could be achieved by reducing the CXS content and increasing the ethylene content, but the high ethylene content makes the transparency and gloss of film bad, and hence, the film does not meet the object of this invention.

COMPARATIVE EXAMPLE 5

A copolymer used in this Comparative Example was produced by the slurry polymerization method using n-heptane as a solvent, and hence freed of an atactic component soluble in n-heptane. The basic specifications of this copolymer are shown in Table 1. (This copolymer corresponds to the copolymer of Example 3 of Japanese Patent Application Kokai (Laid-Open) No. 16,588/77.) Using the copolymer, a biaxially stretched film was produced under the same conditions as in Example 1. The physical properties of this film are shown in Table 2. In the case of this film, although its ethylene content exceeded the specific range of this invention, the change in transparency with the lapse of time was inhibited because of the low CXS content. Moreover, the film was high in Young's modulus and relatively good in transparency and gloss but they cannot be said to be excellent. Therefore, the film did not meet the object of this invention.

COMPARATIVE EXAMPLE 6

A copolymer was produced in accordance with Example 1 of Japanese Patent Application Kokai (Laid-Open) No. 113,692/78. As described in this Japanese

COMPARATIVE EXAMPLE 7

A copolymer was produced with the same catalyst as in Example 1 under the same polymerization conditions as in Example 1, except that the amounts of butene-1 and hydrogen charged were changed. The basic specifications of this copolymer are shown in Table 1. Using the copolymer, a biaxially stretched film was produced under the same conditions as in Example 1, except that the stretching temperature was changed to 130° C. The physical properties of this film are shown in Table 2. The film was high in Young's modulus and poor in transparency, gloss and low-temperature shrink characteristics.

TABLE 1

| Item | Example 1 | Example 2 | Example 3 | Comparative Example 1 | Comparative Example 2 | Comparative Example 3 | Comparative Example 4 | Comparative Example 5 | Comparative Example 7 |
|---|---|---|---|---|---|---|---|---|---|
| $C_{4-1}$ (mole %) | 17.3 | 14.6 | 12.5 | — | 7.5 | 14.3 | — | 4.5 | 6.8 |
| Other $\alpha$-olefin (mole %) | — | — | Ethylene 1.4 | Ethylene 11.6 | Ethylene 3.7 | — | Ethylene 9.5 | Ethylene 3.2 | — |
| CXS (wt %) | 29.6 | 24.8 | 32.7 | 27.1 | 23.3 | 9.5 | 9.6 | 3.7 | 8.1 |
| BHIP (wt %) | 22.8 | 29.5 | 15.8 | — | — | — | — | — | — |
| $[\eta]$ (dl/g) | 2.2 | 1.8 | 1.9 | 1.8 | 1.8 | 1.9 | 1.8 | 1.9 | 1.9 |
| $\Delta$ Haze (%) | 2.0 | 0.3 | 2.8 | 18.3 | 8.5 | 1.5 | 1.2 | 1.0 | 0.9 |

TABLE 2

| Item | Example 1 | Example 2 | Example 3 | Comparative Example 3 | Comparative Example 4 | Comparative Example 5 | Comparative Example 7 |
|---|---|---|---|---|---|---|---|
| Young's modules (MD/TD) (kg/cm²) | 6900/6800 | 7500/7400 | 5100/5600 | 10100/9900 | 6000/5500 | 11500/12100 | 13100/13300 |
| Haze (%) | 0.5 | 0.8 | 0.9 | 1.9 | 3.0 | 1.8 | 3.2 |
| Gloss (%) | 151 | 149 | 147 | 140 | 128 | 141 | 122 |
| Percentage of shrinkage at 130° C. (MD/TD) | 53/49 | 49/48 | 60/59 | 58/59 | 63/61 | 57/58 | 25/24 | publication, this copolymer had a very low BHIP content which was 1% or less. Using the copolymer, a biaxially stretched film was produced under the same conditions as in Example 1, except that the stretching temperature was changed to 90° C. This biaxially stretched film was good in softness, but was very poor in blocking which was measured as not less than 100 g/100 cm².

In contrast, all the films of Examples 1 to 3 according to this invention had blocking values of not more than 10 g/100 cm², and hardly showed blocking. This indicates that a copolymer having an extremely low BHIP content had a much poorer anti-blocking level than the required level. That is, a film which is soft, has a low blocking value and excels in transparency and gloss can be produced only from the copolymer used in this invention, namely, a copolymer wherein the blocking is inhibited by adjusting the BHIP content to 7% by weight or more and the problem of Japanese Patent Application Kokai (Laid-Open) No. 113,692/78 that a high BHIP content makes transparency poor has been solved by adjusting the CXS content to 15–60% by weight, or other means.

We claim:

1. A packaging shrink film consisting essentially of a random copolymer of propylene and an $\alpha$-olefin having 4 or more carbon atoms, wherein the copolymer is produced by vapor phase polymerization in a state substantially free of any liquid medium, said random copolymer satisfying the following conditions:
   (1) the content of the $\alpha$-olefin having 4 or more carbon atoms in the copolymer is 10 to 25 mole %,
   (2) the content of cold xylene-soluble portion in the copolymer is 17 to 50% by weight, and
   (3) the content of boiling n-heptane-insoluble portion in the copolymer is 7% by weight or more, said film having been stretched.

2. A packaging shrink film according to claim 1, which has Young's moduli in the machine and transverse directions of 3,000 to 9,000 kg/cm².

3. A packaging shrink film according to claim 1, which has Young's moduli in the machine and transverse directions of 5,000 to 8,000 kg/cm².

4. A packaging shrink film according to claim 1, wherein the $\alpha$-olefin having 4 or more carbon atoms is butene-1.

5. A packaging shrink film consisting essentially of a random copolymer of propylene and an α-olefin having 4 or more carbon atoms and ethylene, wherein the copolymer is produced by vapor phase polymerization in a state substantially free of any liquid medium, said random copolymer satisfying the following conditions:
  (1) the content of the α-olefin having 4 or more carbon atoms in the copolymer is 10 to 25 mole %,
  (2) the content of ethylene in the copolymer is 3 mole % or less,
  (3) the content of cold xylene-soluble portion in the copolymer is 17 to 50% by weight, and
  (4) the content of boiling n-heptane-insoluble portion in the copolymer is 7% by weight or more, said film having been stretched.

6. A packaging shrink film according to claim 5, which has Young's moduli in the machine and transverse directions of 3,000 to 9,000 kg/cm$^2$.

7. A packaging shrink film according to claim 5, which has Young's moduli in the machine and transverse directions of 5,000 to 8,000 kg/cm$^2$.

8. A packaging shrink film according to claim 5, wherein the α-olefin having 4 or more carbon atoms is butene-1.

* * * * *